United States Patent [19]
Payen

[11] 3,874,300
[45] Apr. 1, 1975

[54] SUSPENSION AND COUPLING DEVICE FOR THE MOVABLE MAGNETIC FIELD UNIT OF A LINEAR INDUCTION MOTOR

[75] Inventor: Jean-Pol Payen, Grenoble, France
[73] Assignee: Societe Dauphinoise Electrique, Grenoble, France
[22] Filed: Mar. 6, 1973
[21] Appl. No.: 338,519

[30] Foreign Application Priority Data
Mar. 15, 1972 France .............................. 72.09749

[52] U.S. Cl............................ 104/148 LM, 310/12
[51] Int. Cl............................................. B61b 13/08
[58] Field of Search.... 104/148 LM, 23 FS; 310/12, 310/13; 105/77

[56] References Cited
UNITED STATES PATENTS
573,823   12/1896   Leffler ........................ 104/148 LM
3,516,364   6/1970   Machefert-Tassin ................. 310/13
3,680,489   8/1972   English ......................... 104/148 LM FOREIGN PATENTS OR APPLICATIONS
1,530,007   6/1968   France ............................... 310/12

Primary Examiner—M. Henson Wood, Jr.
Assistant Examiner—Reinhard J. Eisenzopf
Attorney, Agent, or Firm—Stevens, Davis, Miller & Mosher

[57] ABSTRACT

A suspension and coupling device connecting the movable magnetic field unit straddling the stationary armature of a linear induction motor to the vehicle which moves along the armature. The weight supporting and the thrust transmitting functions of the device are substantially assumed by different parts of the device. Universal joint and slide connections between the different parts of the device permit the vehicle and the magnetic field unit to perform small relative movements one with respect to the other.

10 Claims, 6 Drawing Figures

SUSPENSION AND COUPLING DEVICE FOR THE MOVABLE MAGNETIC FIELD UNIT OF A LINEAR INDUCTION MOTOR

This invention relates to linear induction motors having an upstanding armature or secondary extending longitudinally along a path and which is straddled by a movable magnetic field unit or primary suspended from a vehicle to drive the vehicle along the path. More particularly, the invention relates to a suspension and coupling device connecting the magnetic field unit to the vehicle.

In devices of the kind mentioned the magnetic field unit comprises two parallel confronting vertical pole faces which straddle the armature leaving a small air gap between each pole face and the corresponding side of the armature. The vehicle is independently guided, such as by wheels or air pads, along a track which may be a railroad and the device connecting the magnetic field structure to the vehicle has to allow for relative movement between the vehicle and the magnetic field structure which is independently guided generally guided by the armature, in order to avoid jamming of the magnetic field structure against the armature pursuant to rolling or lateral drift movements of the vehicle. Known coupling devices are incapable to withstand the high stresses set up by high speed vehicles, moved by high power motors. On the other hand, in order to maintain the width of the air gaps as small as possible between the magnetic field unit and the armature, the known coupling devices provide an uncomfortable rigid suspension of the vehicle.

It is an object of the invention to provide a suspension and coupling device capable of transmitting very high driving and braking forces to a high speed vehicle without interfering with the freedom for the vehicle to perform relative movements with respect to the magnetic field unit resulting from small divergent guiding movements or from inertial impetus.

It is another object of the invention to provide a suspension and coupling device supporting a heavy magnetic field unit from the vehicle and permitting independent guiding of the vehicle and of the magnetic field unit.

It is a further object of the invention to provide a suspension and coupling device permitting differential thermal movements of the different parts.

According to an important aspect of the invention, these and other objects are carried out by separating, generally the weight-supporting and the force-transmitting functions in the suspension and coupling device and by providing proper joint arrangements permitting limited relative movements of the different parts and more particularly of the vehicle with respect to the magnetic field unit.

These and other objects and features of the invention will become apparent upon reading of the following description of an embodiment of the invention shown in the annexed drawings, in which.

Figure 1:
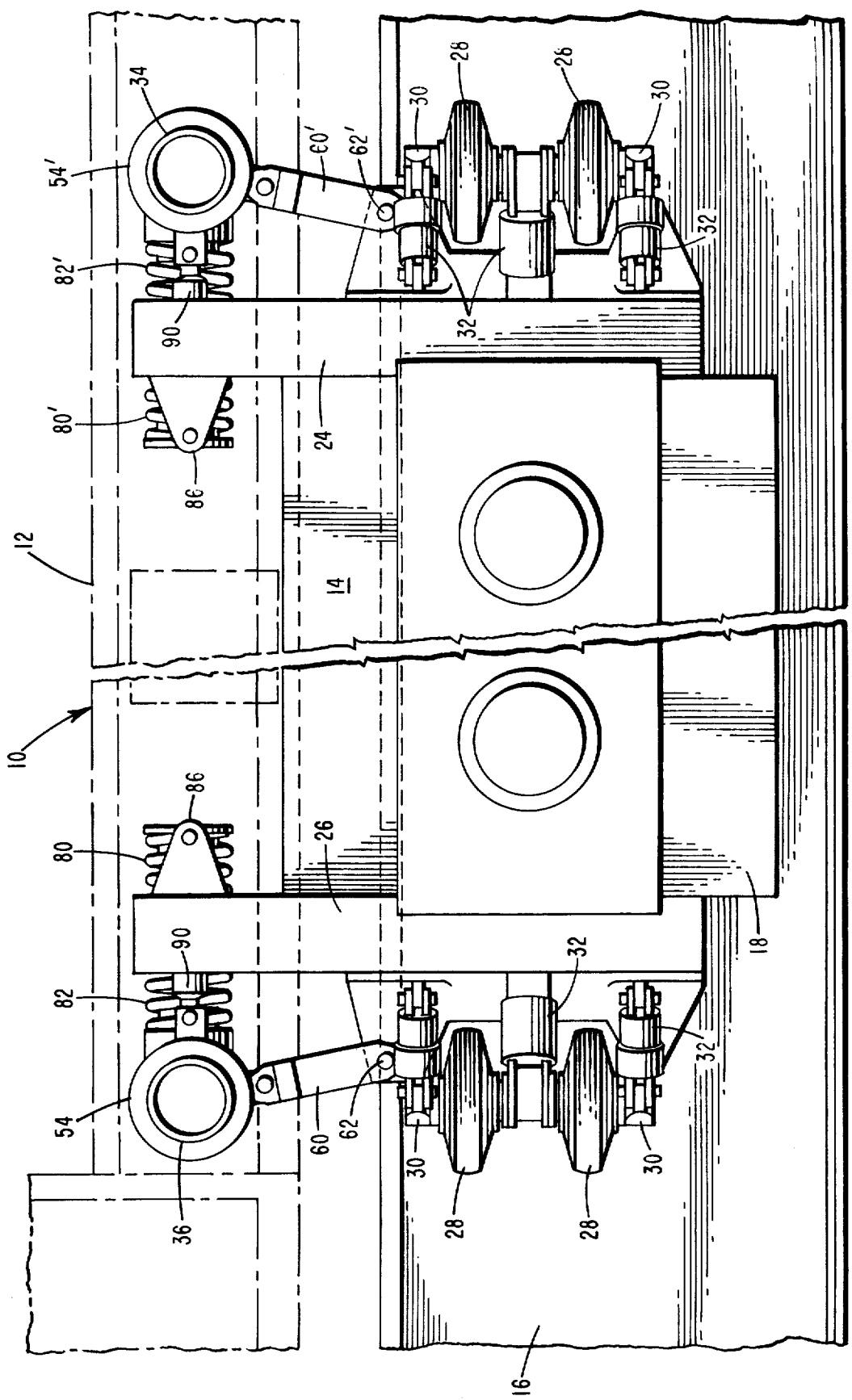
FIG. 1 is a schematic elevational side view of a suspension and coupling device according to the invention, only the lower part of the vehicle being schematically shown in dash-dotted lines.
Figure 2:
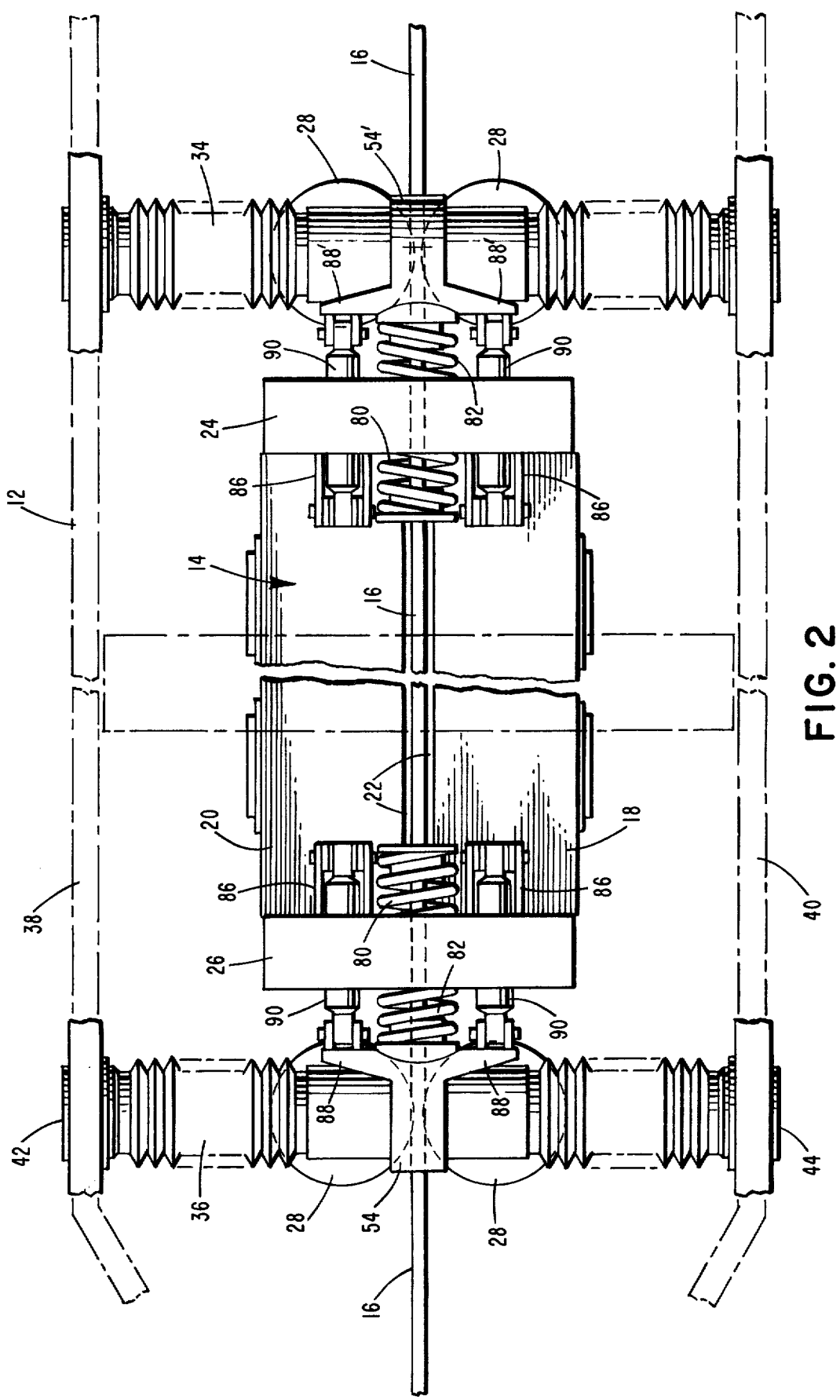
FIG. 2 is a plan view of the device.
Figure 3:
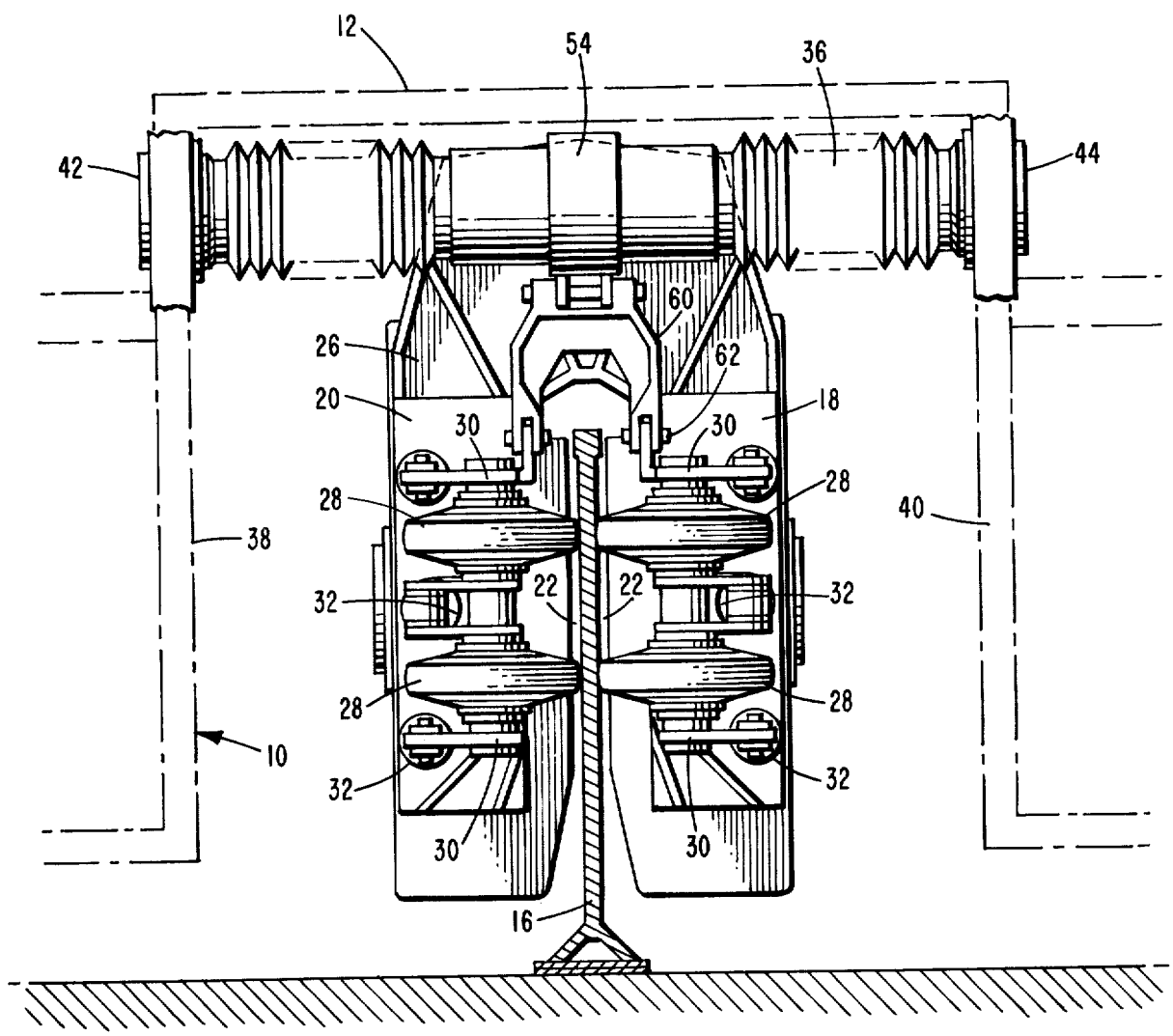
FIG. 3 is an end view from the left.

Referring now to FIG. 1 to 3, there is schematically shown in dash-dotted lines the lower part of the frame of a high speed vehicle 10 which is guided along a track (not shown) which may be formed by a railroad or by air cushion guide walls. The vehicle is propelled along the track by a linear induction motor comprising an upstanding armature plate or secondary 16 extending along the entire length of the track and a magnetic field structure or primary 14 straddling the armature plate 16. The magnetic field unit comprises a pair of polyphase-wound elementary magnetic field structures 18 and 20 sandwiching the armature 16 whereby the confronting pole faces of the structures are separated from the corresponding side faces of the armature by small air gaps 22 in which a linearly translating magnetic field is developped by the energized windings (not shown) of the parts 18 and 20 so as to produce reaction forces in the conducting armature which are generated by the induced currents in the well-known manner. The two structures 18 and 20 are assembled and firmly held together by a pair of U-shaped yokes 24 and 26 capable of withstanding the electrodynamical forces acting between the structures 18 and 20 when the latter are polyphase energized. Other yokes may be added intermediate the end yokes 24 and 26, as desired, to reinforce the assembly. Two pairs of vertically superposed idle guide rollers 28 are mounted on vertical shafts at each end of the magnetic field unit 14 and the laterally movable support structures 30 of the four pairs of rollers 28 are urged towards the side faces of the intermediate armature 16 by resilient bias means schematically shown at 32. The rollers 28 roll on the side faces of the armature and effect in a known manner a perfect lateral guiding and positioning of the primary 14 on the armature rail 16. The vehicle 10 is independently guided along its track in any appropriate manner, such as by rails extending along the track and by wheels or air pads bearing on the rails. The independent guiding of the vehicle and of the magnetic field unit produce relative movements therebetween and these movements are made possible by the suspension and coupling device according to the invention which will now be described.

The vehicle 10 carries two vertical, transversely spaced apart flanges or longitudinal beams or girders 38, 40 supporting two transverse shafts 34, 36 which extend normally horizontally and perpendicularly to the longitudinal direction of the vehicle. The shafts 34, 36 are longitudinally spaced apart and disposed on either end of the magnetic field unit 14 to support the latter and to transmit driving forces produced by the unit. The connection system of the magnetic field unit 14 to the shafts 34 and 36 is the same for either shaft so that only the system associated with the shaft 36 will now be described, duplicate parts of the other system being designated by the same numeral carrying a prime mark.

Figure 6:
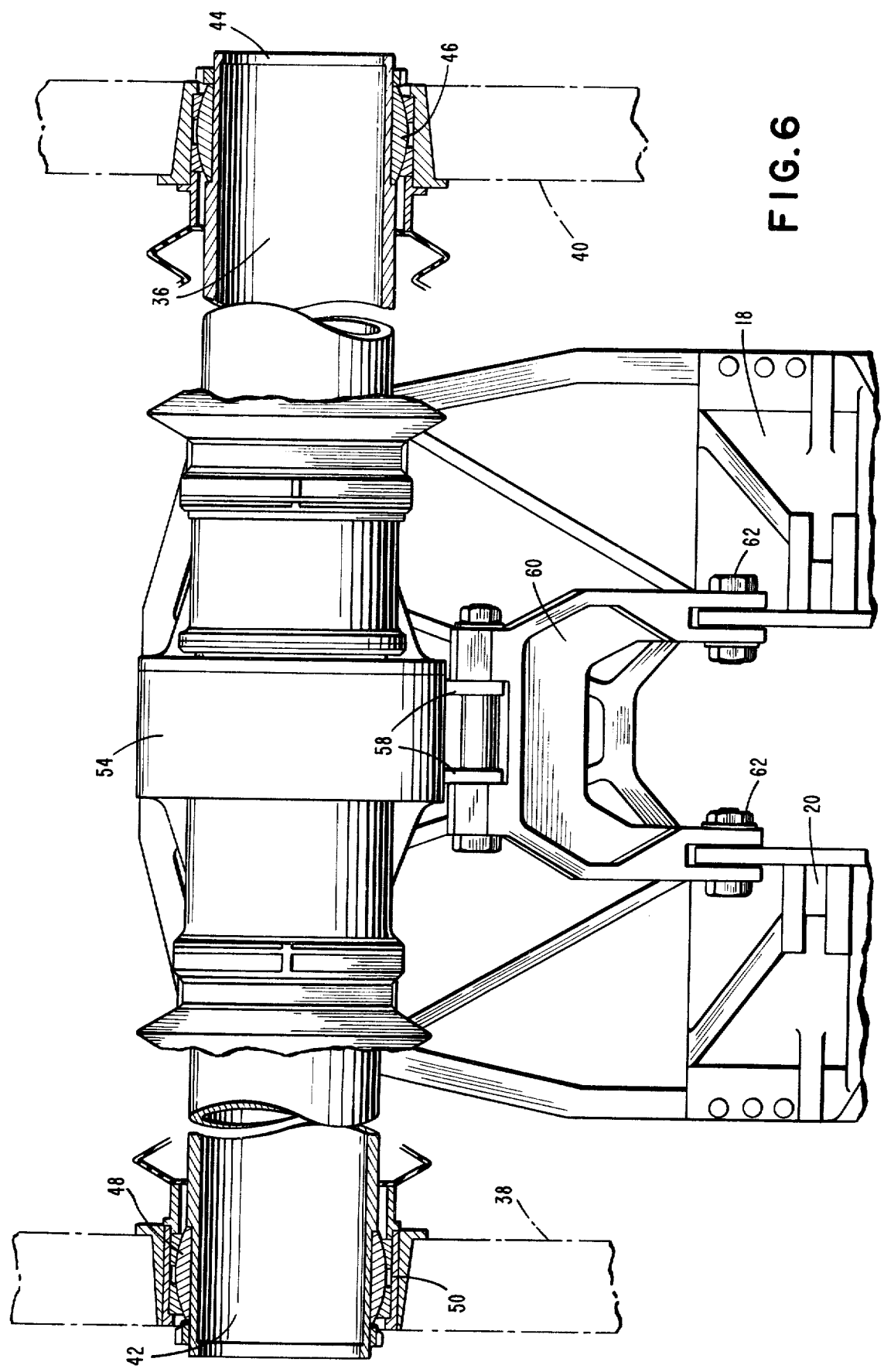
FIG. 6 is a fragmentary view at an enlarged scale and partially in cross section of the device as shown in FIG. 3.

Referring now to FIG. 6, there are shown ball-and-socket or univeral joints 46 and 48 to support the end portions or trunnions 42 and 44, respectively, of the shaft 36. A sliding sleeve 50 surrounds the joint 48 to permit a longitudinal movement of the end portion 42 with respect to the flange 38. The shown universal joint and slide mounting of the shaft 36 allows for different sagging, flexion and sliding movements of the different parts as well as differential thermal or distortion movements without affecting the flanges 38, 40 or interfering otherwise with the normal functioning of the device.

Figure 4:
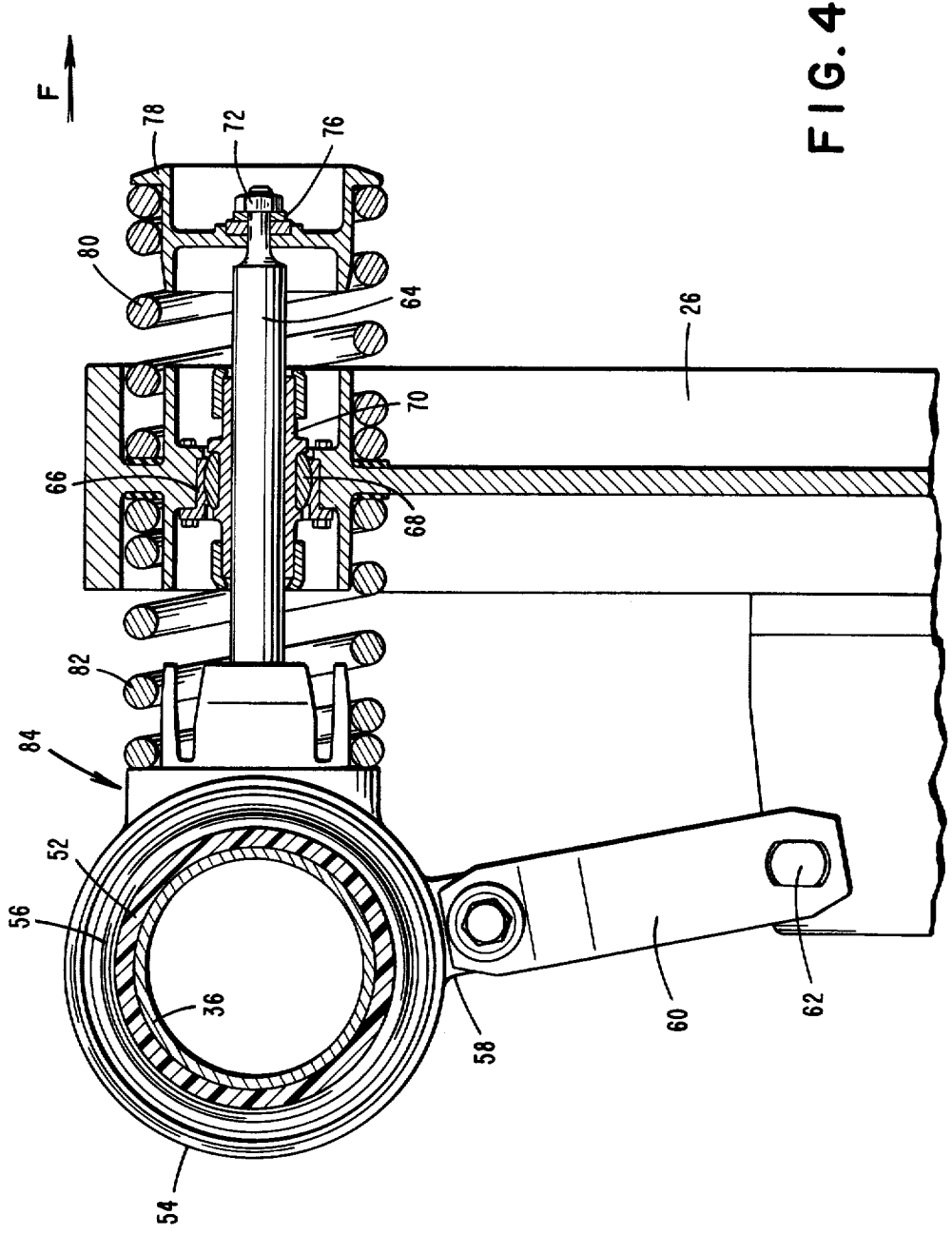
FIG. 4 is a fragmentary elevational side view at an enlarged scale and partially in cross section of the device as shown in FIG. 1.
Figure 5:
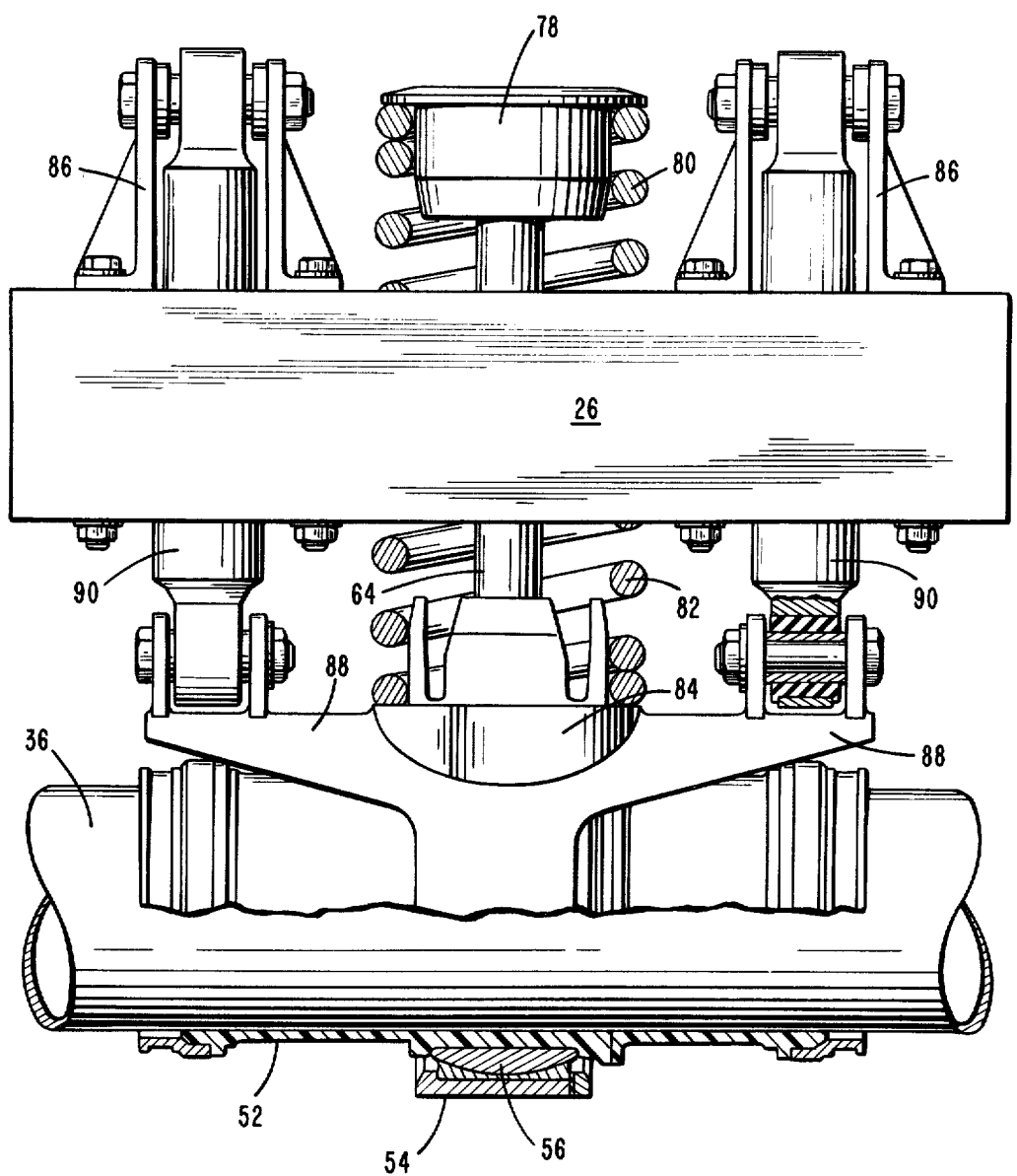
FIG. 5 is a fragmentary plan view at an enlarged scale and partially in cross section of the device as shown in FIG. 2.

A low-friction sleeve 52 (see FIG. 5) is slipped over the central part of shaft 36 whereby a smooth longitudinal sliding of the sleeve 52 on the shaft is ensured by a suitable composition of the contact surface such as by a polytetrafluorethylene interface. A collar 54 is pivotally mounted on the central part of the sleeve 52 by means of a ball-and-socket joint 56 so that the collar 54 may perform limited universal pivotal movements as well as longitudinal sliding movements relative to the shaft 36. The collar 54 carries a peripheral lug 58 (see FIG. 4 and 6) on which rod means 60 are pivotally mounted, the opposed ends of the rod means 60 being pivotally connected at 62 on the magnetic field structures 18 and 20. The rod means 60 may comprise, as shown, U-shaped yokes or any other appropriate linkage system, such as chain mails, pivotally suspending the end portions of the primary from the shafts 34 and 36. In the embodiment shown, the rods 60, 60' are slightly inclined with respect to the vertical, the collars 54, 54' taking a normal position corresponding to the alignment of the rods 60, 60' with the center of the axes 62, 36 and 62', 34, respectively. The steady-state position is a stable equilibrium position, around which the magnetic field unit 14 may perform small longitudinal rocking movements whereby the end portions of the primary 14 perform small raising or falling movements. These vertical movements remain small given the tangential direction of the displacement of axes 62 and 62' and the weight of the primary.

The collar 54 carries further a spring-supporting radial rod 64 (see FIG. 4) which extends normally horizontally in the direction of the transverse symmetry plane of the magnetic field unit. The rod 64 traverses an orifice 66 arranged in the upper web portion of the yoke 26 whereby a ball-and-socket 68 and sliding sleeve 70 similar to those described with reference to the collar 54 are inserted between the yoke 26 and the rod 64 so that the yoke may perform limited universal joint and sliding movements on the rod 64. A spring seat 78 is secured to the free end of the rod 64 by a nut 72 associated with a semi-spherical bearing member 76. A heavy compression spring 80, which is coaxial with the rod 64, is inserted between the spring seat 78 and one end face of the web portion of the yoke 26 and a second coaxial compression spring 82 is inserted between the opposed end face of the yoke and a bearing surface 84 shaped on the collar 54. Thus a force in the direction of the arrow F is transmitted by the yoke 26 to the collar 54 and to the shaft 36 by spring 80, spring seat 78 and rod 64. A force in the opposite direction is transmitted by the spring 82. The resulting compression and extension of the springs 80, 82 causes the yoke 26 along with the sleeve 70 to slide longitudinally on the rod 64. The universal joint connection 68 and 76 permit the rod 64 to adapt an inclined position with respect to the yoke 26 when collar 54 pivots pursuant to the displacement of the rods 60 and 60'. Damping devices 90 (see FIG. 2 and 5) are inserted between brackets 86 carried by the yoke 26 and arms 88 formed on the collar 54 to damp the transient rocking movements of the magnetic field unit 14.

This coupling of the primary 14 to the shafts 36, 34 through yokes 26, 24 and springs 80, 82; 80', 82' assumes substantially only the driving function of the assembly because ball-and-socket connections 56 and 68 cannot transmit a torque to the shaft. The weight-supporting function, on the other hand, is mainly assumed by pivotally interconnected rods 60, 60' and collars 54, 54' which are substantially relieved from the driving function.

The device operates in the following manner:

At standstill and in the normal steady-state position shown in the FIGURES, the primary 14 is longitudinally centered between the shafts 34, 36 so that the rods 60, 60' extend symmetrically, as shown. The secondary or armature rail 16 extends in the longitudinal symmetry plane of the air gaps 22 between the pole faces of the two elementary structures 18, 20, respectively, the vehicle and the primary being thus centered on the rail 16. In case of a lateral drift of the vehicle 10, the primary 14 is laterally displaced on shafts 34, 36 under the action of guide rollers 28 whereby sleeves 52 slide on the shafts. Joints 56 permit rolling movements of the vehicle without undue stressing of shafts 34, 36.

Longitudinal rocking movements of the primary 14 with respect to the vehicle 10 may produce a limited pivoting on shafts 34, 36 which support the primary 14 through the rods 60, 60'. Each shaft 34, 36 transmits to the vehicle 10 substantially half of the driving thrust and supports substantially half of the weight of the primary, the driving and supporting functions being assumed by substantially independent connection ways. Both ways converge to the collars 54, 54' which operate without applying a torque to shafts 34, 36. The universal joint mounting of the ends of shafts 34, 36 permits a slight bending of the shafts under the action of the weight of the magnetic field unit 14.

The sliding mounting of the yokes 26 and the force-transmitting springs 80, 82 permit thermal differential movements of the primary 14 which may heat when energized.

What is claimed is:

1. A suspension and coupling device connecting a movable linear induction motor magnetic field unit straddling an upstanding stationary armature rail to a vehicle moving along said armature rail, comprising:
   a pair of substantially parallel shafts extending transversely of said vehicle and spaced in the longitudinal direction thereof adjacent the longitudinal end portions of said field unit, respectively;
   linkage means suspending each of said end portions from the adjacent shaft, said linkage means being pivotally connected to said end portions and to said shafts to support the weight of said field unit and to permit longitudinal rocking movements of said field unit;
   a pair of driving-force transmitting members projecting from said field unit adjacent said shafts, respectively, and having each a drive portion horizontally aligned with the corresponding shaft; and
   self-centering resilient transmission means connecting said drive portions resiliently to the corresponding shaft thereby to apply to said shafts substantial horizontal driving forces produced by said field unit and to permit to said field unit to execute said rocking movement against the action of said self-centering resilient transmission means.

2. A device according to claim 1, said linkage means comprising for each shaft a collar mounted for free rotation thereon and having a peripheral lug means, and rod means having opposed ends pivotally connected to said lug means and to the corresponding end portions of said field unit, respectively.

3. A device according to claim 2, said linkage means further comprising ball-and-socket and sliding means permitting limited universal motion and axial sliding of said collars relative to said shafts.

4. A device according to claim 3, said field unit carrying roller means resiliently urged against both sides of aid armature rail at both end portions of said field unit to space said field unit from said armature.

5. A device according to claim 1, further comprising a pair of side flanges depending from said vehicle, said side flanges supporting for each shaft a pair of ball-and-socket means to support the end portions of said shafts for limited universal motion thereof.

6. A device according to claim 5, said side flanges carrying slide means permitting limited longitudinal movement of one of said end portions of said shafts relative to the corresponding side flange.

7. A device according to claim 1, said linkage means comprising for each shaft a collar mounted for free rotation thereon and carrying a spring-supporting rod extending radially from said collar and traversing said drive portion substantially horizontally, both sides of said drive portion and both ends of said rod carrying spring retaining members accomodating spring means for self-centering of said drive portion between said ends of said rod, said spring means being adapted to transmit a driving force produced by said field unit to the corresponding shaft.

8. A device according to claim 7, said drive portion carrying ball-and-socket and slide means permitting limited universal and longitudinal motion of said rod relative to said drive portion.

9. A device according to claim 7, said collar having peripheral lug means, said linkage means including rod means having opposed ends pivotally connected to said lug means and to the corresponding end portion of said field unit, respectively, to suspend said field unit from said shafts.

10. A device according to claim 9, said linkage means further comprising universal joint and slide means permitting limited universal motion and axial sliding of said collars relative to said shafts.

* * * * *